Nov. 17, 1931.  M. SHULDINER  1,832,743
ARTIFICIAL ANIMAL EYE
Filed July 16, 1930
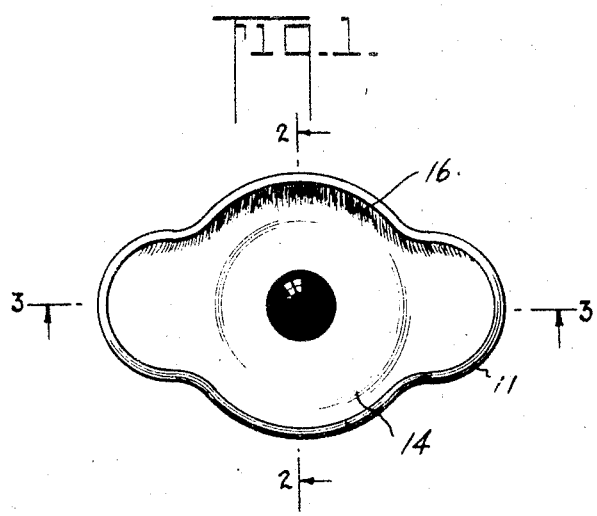
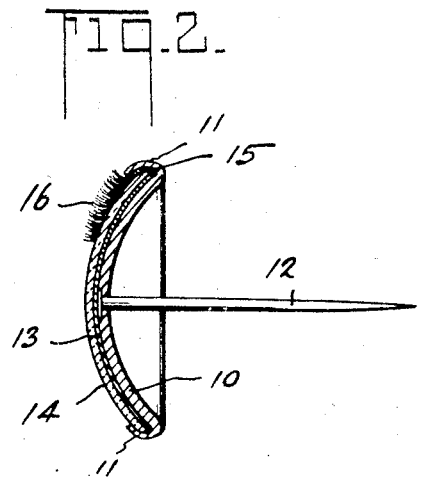
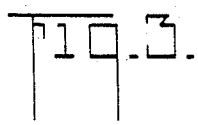
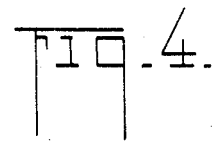
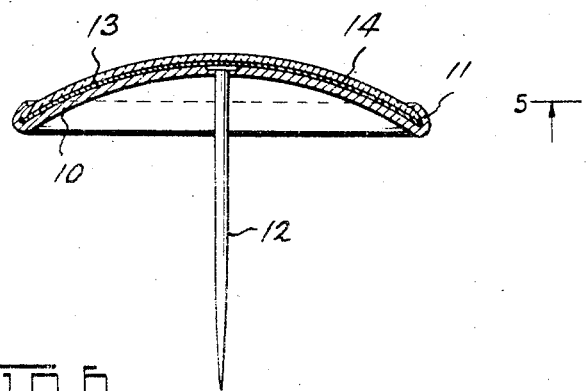
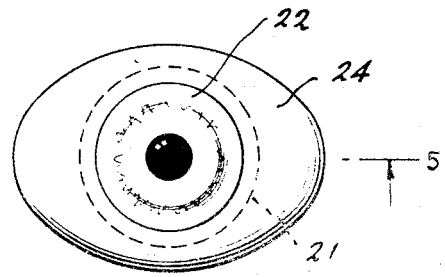
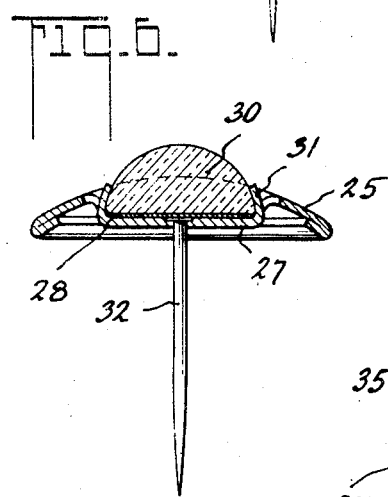
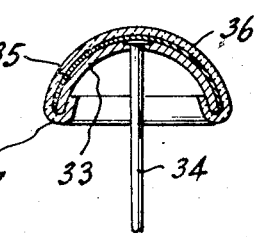
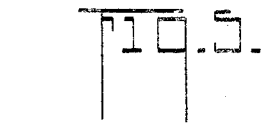
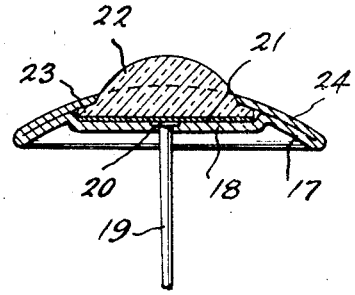
MORRIS SHULDINER
INVENTOR
BY Victor J. Evans
ATTORNEY Patented Nov. 17, 1931

1,832,743

UNITED STATES PATENT OFFICE

MORRIS SHULDINER, OF BROOKLYN, NEW YORK

ARTIFICIAL ANIMAL EYE

Application filed July 16, 1930. Serial No. 468,371.

The present invention relates to artificial eyes in general and particularly to artificial animal eyes.

One of the objects of this invention is to produce an article of this kind in a far less expensive and more effective manner than heretofore produced.

One of the outstanding objects of my invention is to provide an imitation of an animal eye which may be readily secured to the head of a fur piece by simply pinning it thereto.

Another object of my invention is to provide means whereby a most lifelike appearance of an animal eye may be produced at a considerably smaller expenditure in labor, time and material than was heretofore possible and so produce such artificial eyes as to include artificial eyelashes still more enhancing the lifelike appearance of the product.

Other objects and advantages of the invention will be hereinafter specifically pointed out, or will become apparent, as the specification proceeds.

With the above indicated objects in view, the invention resides in certain novel constructions and combinations and arrangement of parts, clearly described in the following specification and fully illustrated in the accompanying drawings, which latter show embodiments of the invention as at present preferred.

In said drawings:

Fig. 1 represents a plan view of a preferred form of my device illustrating a reproduction of a fox eye.

Fig. 2 is a cross sectional view taken on line 2—2 of Fig. 1 showing the construction of my device.

Fig. 3 is a cross sectional view taken on line 3—3 of Fig. 1.

Fig. 4 illustrates a modified form of construction of my device.

Fig. 5 is a cross sectional view taken on line 5—5 of Fig. 4.

Fig. 6 illustrates a modified construction similar to that shown in Figs. 4 and 5: and Fig. 7 is still another modified form of my device similar to that shown in Fig. 2 but differentiating in the assembly arrangement.

Referring to the figures, numeral 10 denotes the base member of my device which consists preferably of a metal blank which is bowed or dished or otherwise curved so as to provide a concave inner surface and a convex outer surface. The outer edge of the base member 10 is turned in upon itself as clearly seen in Fig. 2 at 11. Attached to about the center portion of the base member and extending from the rim thereon is a shank or pin 12 which is intended for the purpose of attaching the article to the skull of a fur piece.

Against the convex or outer surface of the base member there will be seen provided a wafer or sheet indicated at 13 and comprising preferably a sheet of paper or other material upon which is imprinted preferably in colors the image or reproduction of an eyeball.

Over the sheet of wafer 13 will be seen another layer 14 which is made of transparent material as for instance celluloid or cellophane. At the upper rim of the eye reproduction there will be seen in section in Fig. 2 an eyelash member 15 from which extend artificial eyelashes 16 clearly seen in Fig. 1. From Fig. 2 it will be evident that the edge 11 of base member 10 is turned upon itself and closes and holds together wafer 13 upon which the image of the eye is printed or otherwise reproduced. When the outer edge is forced against the base member all the articles clamped thereby are held rigidly in place.

Referring to Figs. 4 and 5 which illustrate modified forms of my device it will be seen that the base member 17 comprises a substantially curved sheet member which however is flattened at 18 and from the flattened portion extends shank or pin 19 attached centrally thereto at 20. Upon the flattened rounded portion 18 there will be seen a wafer 21 upon which is printed or otherwise reproduced the image of the iris and the pupil as clearly seen in Fig. 4.

Resting upon wafer 21 there will be seen a transparent member 22 provided with a rim 23 which serves as securing means for the transparent member 22 within base member 17, the outer portion 24 of which extends towards and around said transparent member 22. Preferably the outer surface of the base member portion 24 is enameled white so as to resemble the eyeball.

In Fig. 6 there will be seen a similar construction to that shown in Fig. 5 with the exception that the base member 25 is provided with a prominent central depression 27 in which is lodged a wafer 28 and a transparent cover member 30. The latter is held by means of punched out prongs 31 in its proper position relative to the rest of the base member. From the depressed portion 27 of the base member there extends centrally an attaching pin 32.

A still further modified form shown in Fig. 7 illustrates a construction wherein the base member 33 is curved similarly to the shapes illustrated in Figs. 2 and 3, being provided with a centrally extending shank or pin 34. A wafer 35 will be seen resting upon the convex surface of the base member and the transparent member 36 covering the wafer 35 extends over the latter and its edges 37 are bent upon themselves inwardly as clearly illustrated.

The foregoing description of the various modified forms of my device clearly indicate the manner of construction and assembly and it is evident that this manufacture is considerably less expensive than similar articles produced heretofore and which consist of glass reproductions of eyes and were, because of their high cost, restricted to one sort of shape, that is, to the reproduction of the iris alone. I do not know of any attempt heretofore made of producing an imitation eye in its lifelike form with the addition of eyelashes as is clearly shown in Figs. 1 and 2 and described above.

The hereinbefore described construction admits of considerable modification without departing from the invention; therefore, it is the wish not to be limited to the precise arrangements shown and described, which are as aforesaid, by way of illustration merely. In other words the scope of protection contemplated is to be taken solely from the appended claims, interpreted as broadly as is consistent with the prior art.

What I claim as new is:

1. In an artificial animal eye, the combination with a bowed base member having the general contour of an eye shape, of an attaching pin extending from the rear face thereof, an eye representation member conforming in shape to substantially that of said base member and consisting of a sheet upon which is reproduced the image of an eye, said eye representation member associated with the outer face of said base member, a transparent member associated at its edges with said base member and adapted to cover said eye representation member, and an eyelash member provided at and affixed to the edge of the thus formed eye, said base member having an overturned edge for securing together said base member, said transparent member, and said eyelash member.

2. An artificial animal eye, comprising a base member having the general outlines of an eye, an attaching pin or shank extending from the rear face thereof, a colored eye representation wafer associated with the outer face of the base member, a transparent member provided over said wafer, an eyelash member disposed at the edge of the eye, the edge of said base member being curved upon itself and holding said wafer, said transparent member and said eyelash member together.

3. An artificial animal eye, comprising a sheet metal, bowed base member having the edge turned upon itself, a pin or attaching shank extending from the rear face of said base member, a colored eye-representing sheet or wafer secured to the outer face of said base member, a transparent member covering said colored sheet, an eyelash member disposed at the edge of said base member, the turned edge of the latter holding together said sheet, said transparent and said eyelash members.

4. An artificial animal eye, comprising a base curved member having a flattened center portion, a colored wafer representing the iris of an eye laid flat against said flattened portion, a transparent member disposed over said wafer, said two members having interlocking portions including an inturned flange formed on one of said members, said portions coacting to hold said transparent member and said wafer in proper relation with said base member, and an attaching pin extending from the rear of the flattened base member portion.

5. An artificial eye, comprising a curved base member having a turned over edge, said base member being sheetlike to have opposite faces, an eye representation wafer attached to one face of said base member, a transparent member covering said wafer and attached to said base member by means of said turned-over edges, and an attaching pin extruding from substantially the center of the other face of said base member.

6. An artificial eye, comprising a curved base member having a central flattened depression and an inwardly turned edge, prongs stamped from the depressed base material, an iris-representing wafer disposed within said depression and a transparent member set over said wafer and into said depression, said prongs adapted to hold said transparent member in desired position relative to said base member.

In testimony whereof I hereby affix my signature.

MORRIS SHULDINER.